E. H. VAN NATTA.
MOLDING MACHINE.
APPLICATION FILED JAN. 30, 1907.
941,214.
Patented Nov. 23, 1909.
3 SHEETS—SHEET 2.
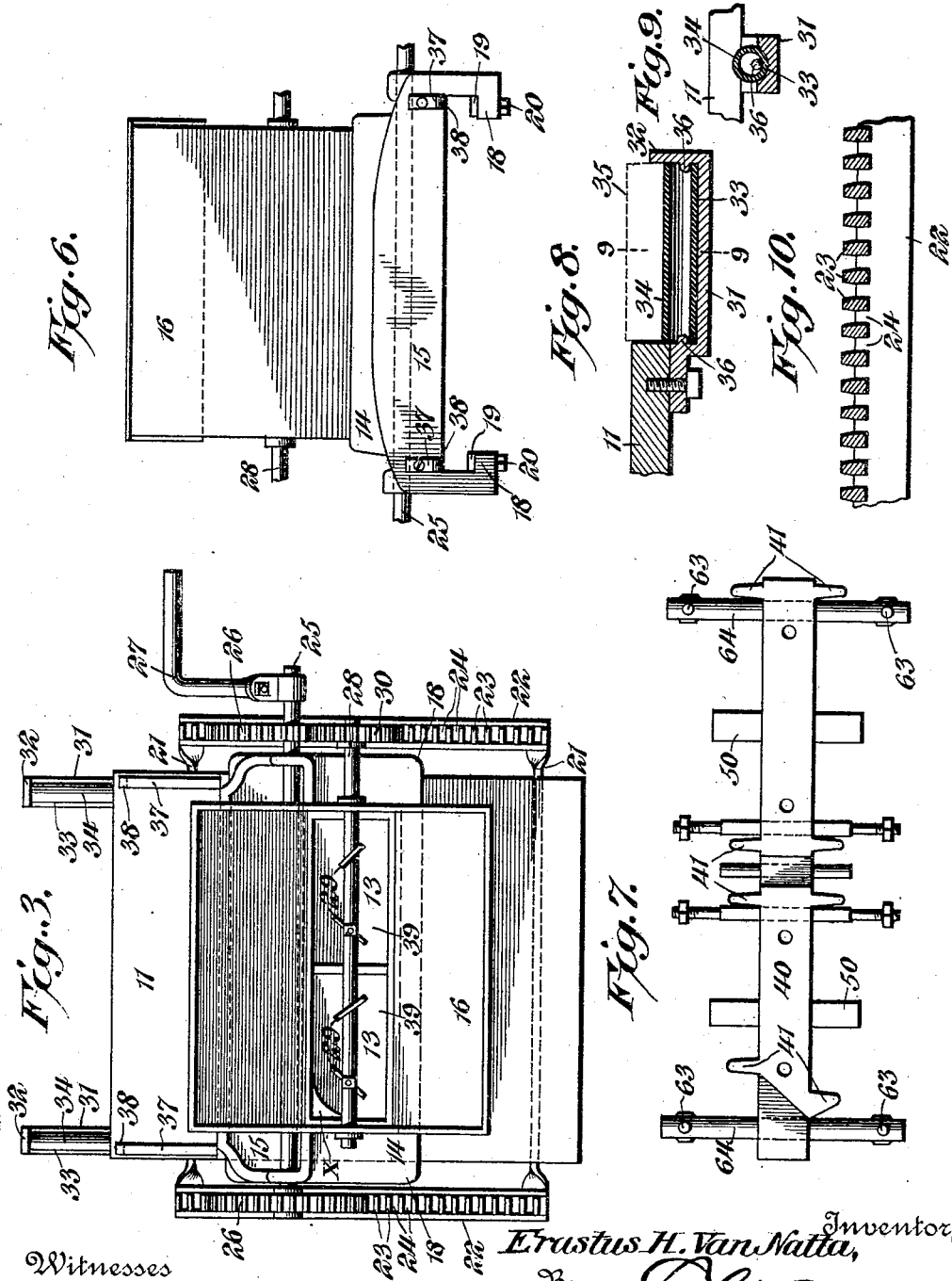

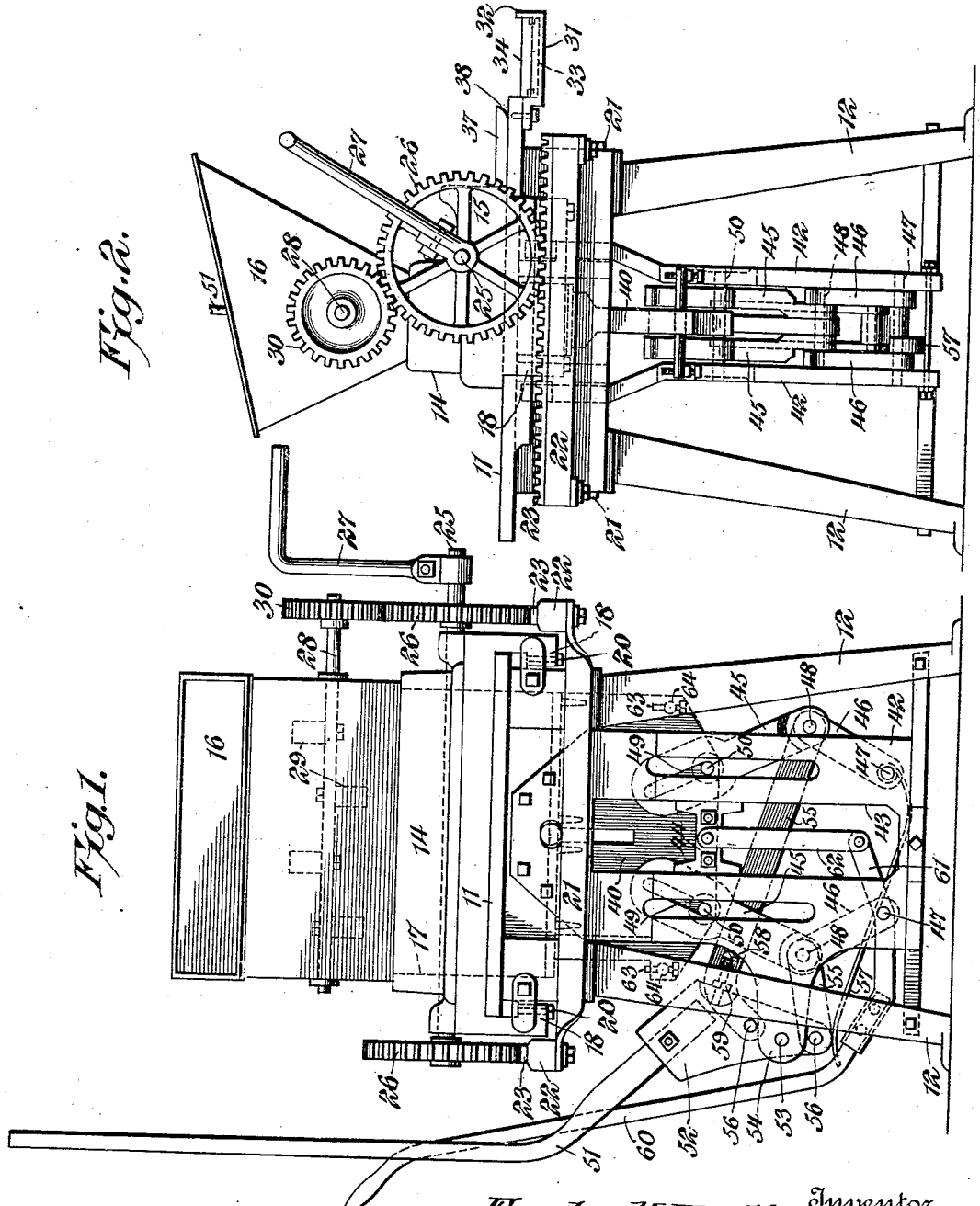

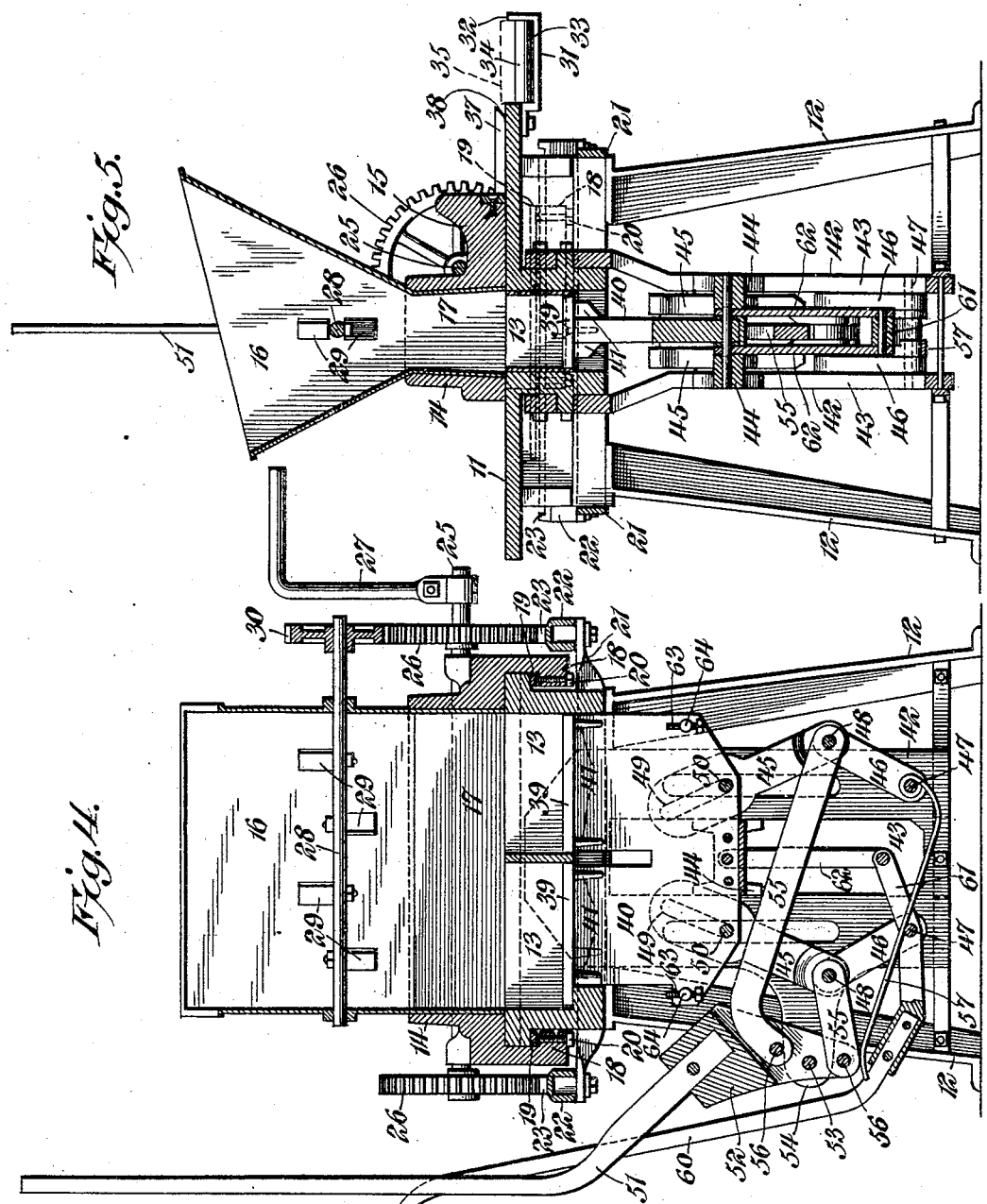

UNITED STATES PATENT OFFICE.

ERASTUS H. VAN NATTA, OF BELLEVILLE, KANSAS.

MOLDING-MACHINE.

941,214.  Specification of Letters Patent.  Patented Nov. 23, 1909.

Application filed January 30, 1907. Serial No. 354,850.

*To all whom it may concern:*

Be it known that I, ERASTUS H. VAN NATTA, a citizen of the United States, residing at Belleville, in the county of Republic and State of Kansas, have invented a new and useful Molding-Machine, of which the following is a specification.

This invention relates more particularly to brick or block molding machines of a well known type.

One of the principal objects of the present invention is to provide in connection with a movable feed carriage, simple and novel means for effecting the movement of said carriage, and to furthermore employ the carriage operating means for moving the agitator employed in connection with the carriage.

Another object is to provide novel and effective pallet-supporting means, and devices for properly alining a pallet placed on the means, with the table platform or top, while the molded articles are being delivered from the latter to the former, thus obviating the danger of breaking said articles, which has heretofore been a serious defect in machines of this character.

A still further object is to provide powerful and simple pressing and ejecting mechanism, to provide means for adjusting the same so that the various actions will be properly carried out, to provide means that will permit the molding of ornamental bricks, and to provide feeding means that will not become clogged.

The preferred embodiment of the invention is disclosed in the accompanying drawings, wherein:—

Figure 1 is an end elevation of the machine. Fig. 2 is a side elevation of the same. Fig. 3 is a top plan view of the machine. Fig. 4 is a vertical cross sectional view. Fig. 5 is a vertical longitudinal sectional view. Fig. 6 is a rear elevation of the carriage. Fig. 7 is a plan view of the mold plunger. Fig. 8 is a longitudinal sectional view through one of the pallet supports. Fig. 9 is a cross sectional view therethrough on the line 9—9 of Fig. 8. Fig. 10 is a detail longitudinal sectional view through one of the racks.

Similar reference numerals designate corresponding parts in all the figures of the drawings.

In the embodiment illustrated, a table is employed, comprising a platform or top 11 supported on legs 12, the top or platform having one or more molds or mold cavities 13 therein that open through its upper surface. Slidably mounted on the platform 11 is a feed carriage or laterally movable pressure plate 14 provided at one side with an abutment portion 15 that also constitutes means for moving the molded articles over the platform, as hereinafter described. The carriage 14 is supplied with a feeding hopper comprising a downwardly tapered upper portion 16, and a downwardly flared lower portion 17, the latter being located within the carriage body, as shown in Fig. 5. The ends of the carriage body or pressure plate are provided with depending inwardly turned flanges 18 that slidably engage beneath and overhang the side margins of the table, whereby said carriage is interlocked with said table. Wear strips or gibs 19 are interposed between the flanges 18 and the margins of the table, and are adjusted toward the latter by screws 20 threaded through the flanges and engaging the under sides of said strips, as illustrated in Fig. 4.

Secured to the ends of the table are transverse supporting bars 21 that project beyond the sides of said table, and have secured thereto longitudinal horizontal racks 22, these racks thus being located on opposite sides of the table platform, and as shown in Fig. 10 having spaced teeth 23, the spaces 24 between the teeth being bottomless. An actuating shaft 25 is journaled on the carriage, and gear wheels 26 fixed to said shaft, mesh with the teeth of the racks. An operating crank 27 is secured to one end of the shaft 25. Rotatably mounted in the upper or downwardly tapered portion 16 of the hopper, is an agitator shaft 28 carrying a plurality of stirring blades 29. This shaft projects beyond one side of the hopper and carries a gear wheel 30 that is in mesh with one of the gear wheels 26 of the actuating shaft. The upper edge of the hopper, as shown in Figs. 2 and 5, is upwardly and rearwardly inclined.

Secured to the delivery end of the machine, is yielding pallet-supporting means. As shown, this means preferably consists of outstanding arms or brackets 31 secured to the table platform and having their outer terminals upturned, as shown at 32. The upper faces of the arms are provided with recessed seats 33, in which are mounted yielding tubular pallet supports 34 preferably, rubber hose. The upturned terminals 32 project above the supports 34 in order to constitute stops for a pallet, as 35, placed on the yielding supports 34 with its upper surface substantially even with the top of the table. Said supports 34 are held in place by any suitable means, as for instance, nipples 36 engaged in their ends, as shown in Fig. 8. Secured to the abutment end 15 of the carriage or pressure plate, are horizontally disposed fingers or guides 37 that rest flat upon the table top or platform, and have the under sides of their outer ends beveled or inclined upwardly as shown at 38. The under face of each guide or finger is flush with the under face of the pressure plate. These fingers are arranged to pass beyond the delivery end of the table, and thus ride upon a pallet placed upon the pallet-supporting means.

Operating in the molds 13 are plunger plates 39 carried by the upper end of a bifurcated plunger body 40, said body having outstanding supporting brackets 41 disposed beneath the plunger plates. The plunger body 40 is located between a pair of standards 42 secured beneath the table and having vertical guide slots 43. Guide blocks 44, secured to the opposite sides of the plunger body, operate in the slots, and thereby insure the proper movement of the plungers. Spaced sets of oppositely disposed toggle links 45—46 have their lower ends pivotally mounted as shown at 47 to and between the standards 42, said links being pivotally connected, as shown at 48, and the upper links 45 having longitudinal slots 49 in their upper end portions. These links have their upper ends disposed on opposite sides of the plunger body 40, and pivot pins 50 passing through the lower end of the plunger body, are engaged in the slots 49. A pressing lever 51 has a head 52 fulcrumed between its ends, as shown at 53 to outstanding ears 54, carried by the standards, and links 55 pivotally connected as shown at 56 to the lever head on opposite sides of the fulcrum 53, are connected to the pivots 48 of the toggle links 45—46. It will be evident therefore, and particularly by reference to Fig. 4 that if the outer end of the lever 51 is swung downwardly, the links will be brought into alinement, thereby raising the plunger body 40 and plunger plates 39 with great power. In order to normally hold the lever 51 in its elevated position, a friction leaf spring 57 secured to one of the pivots 47, has a bearing on the other pivot 47, and has a frictional bearing at its free end against the lower end of the head 52. In order to determine the lowermost position of the plunger plates 39, and consequently the amount of material permitted in the molds, a stop screw 58 is threaded into the head 52 of the lever 51, and is arranged to abut against one of the ears 54. This screw can be securely held against accidental movement by a jam nut 59.

For the purpose of expelling the pressed articles from the molds, an expelling lever 60 has a yoke head 61 fulcrumed on one of the pivots 47, and the inner end of the yoke head 61, has link connections 62 with the lower end of the plunger head 40. The upward movement of the plungers by the lever 60 is limited by stop screws 63 threaded through the ends of arms 64 that project on opposite sides of the plunger head, said screws being arranged to engage the under side of the table.

The operation of the machine may be briefly described as follows. The material to be molded is placed in the hopper 16, the levers 51 and 60 are placed in their elevated positions, and the carriage is operated by turning the crank 27 until the lower portion 17 of the hopper is over the molds. The material will thereupon gravitate into said molds, after which the crank is turned to effect the movement of the carriage so that the abutment 15 will be over the molds. Thereupon the lever 51 is depressed and straightens or alines the toggle links 45—46, and raises the plungers, pressing the material in the molds against the abutment 15. The carriage is now moved still further until the abutment 15 is at one side of the mold, whereupon the lever 60 is depressed. This will cause a still further upward movement of the plungers and the screws 63 will stop said plungers with their upper faces flush with the upper face of the platform 11. The movement of the crank 27 is now reversed, whereupon the carriage will be moved in an opposite direction, and the end abutment will move the molded articles from the supported plungers over the table platform. A pallet, as 35, in the meantime has been placed upon the yielding supports 34, and the edge thereof will be located at a slight distance above the upper face of the platform 11, but as the carriage moves toward the same, the fingers 37 will ride upon the upper face of the pallet and force the same downwardly until the faces are flush and consequently the molded articles will move without interference or jar on to said pallet. The above described operation is then repeated to form other bricks.

There are a number of important and advantageous features in this machine. In the first place, simple means, namely, the racks and gears are provided for moving the carriage, and the racks are open so that material will not clog therein. Furthermore the actuating means for the carriage constitutes the means for actuating the agitator. The pallet support is an important feature, for heretofore great trouble has been experienced in providing means that will support or position the pallets with their upper faces in proper alinement with the upper face of the platfrom, over which the molded articles are moved. The construction of the hopper also obviates a difficulty heretofore encountered, namely the danger of the material becoming stuck and clogging in the lower portion thereof. The construction of the mold and plunger permits the use of filling blocks, as illustrated at X in Fig. 3 so that ornamentally-shaped blocks may be made in the machine. The plunger operating means, and particularly the pressing mechanism is very powerful and simple, and the means for limiting the movements of the plungers is important for the reasons already outlined.

From the foregoing, it is thought that the construction, operation and many advantages of the herein described invention will be apparent to those skilled in the art, without further description, and it will be understood that various changes in the size, shape, and proportion may be resorted to without departing from the spirit or sacrificing any of the advantages of the invention.

Having thus fully described my invention, what I claim as new, and desire to secure by Letters Patent, is:—

1. In a molding machine of the character described, the combination with a mold, of feeding means movable to and from a position over the mold, a rack supported alongside the mold, a gear wheel journaled on the feeding means and meshing with the rack, and means for rotating the gear wheel to thereby cause said movement of the feeding means.

2. In a molding machine of the character described, the combination with a mold, of feeding means movable to and from a position over the mold, racks supported along opposite sides of the mold, a shaft journaled on the feeding means, gear wheels carried by the shaft and meshing with the racks, and means for rotating the shaft.

3. In a molding machine of the character described, the combination with a table having a mold, of a carriage slidably mounted on the table and interlocked therewith, a feeding hopper mounted on the carriage, racks secured to the opposite sides of the table, a shaft journaled on the carriage, gear wheels fixed to the shaft and meshing with the racks, and an operating crank secured to the shaft.

4. In a molding machine of the character described, the combination with a mold, of feeding means movable to and from a position over the mold, racks supported along opposite sides of the mold and having teeth with bottomless spaces between them, a shaft journaled on the feeding means, gear wheels fixed to the shaft and meshing with the racks, and means for rotating the shaft.

5. In a molding machine of the character described, the combination with a mold, of feeding means movable to and from a position over the mold, an agitator movably mounted on the feeding means, and common means for moving the feeding means and operating the agitator.

6. In a molding machine of the character described, the combination with a mold, of feeding means movable to and from a position over the mold, an agitator movably mounted in the feeding means, and means mounted on the feeding means for moving the same, said means being connected to the agitator for operating it.

7. In a molding machine of the character described, the combination with a table, of a mold located therein, a carriage movable on the table and having a hopper movable into and out of coaction with the mold, a rotatable agitator located in the hopper, and means rotatably mounted on the carriage and engaging the table to move the carriage, said means being geared to the agitator.

8. In a molding machine of the character described, the combination with a table having racks along its opposite sides, of a mold located in the table, a carriage slidably mounted on and interlocked with the table, a hopper mounted on the carriage and movable into and out of coaction with the mold, a rotatable agitator journaled in the hopper and having a gear wheel, a shaft journaled on the carriage, means for rotating the shaft, and gears carried by the shaft and meshing with the racks, one of said gears being also in mesh with the gear of the agitator.

9. In a molding machine of the character described, the combination with a table having a mold, of a feeding carriage slidably mounted on the table and having inturned flanges that extend beneath the opposite side margins of the table, wear strips interposed between the flanges and table margins, and means carried by the flanges and engaging the strips for adjusting them toward the table margins.

10. In a molding machine of the character described, the combination with molding mechanism, of a platform over which the molded articles are expelled, and means for yieldingly supporting an article-receiving pallet in line with the platform.

11. In a molding machine of the character described, the combination with a table having a platform, of molding mechanism associated therewith, means for moving the molded articles over the platform, and yielding pallet supporting means located at one edge of the platform.

12. In a molding machine of the character described, the combination with a table having a platform, of molding mechanism associated therewith, means for moving the molded articles over the platform, an outstanding arm projecting from the platform, and a yielding pallet support mounted on the arm.

13. In a molding machine of the character described, the combination with a table having a platform, of molding mechanism associated therewith, means for moving the molded articles over the platform, an outstanding arm projecting from the platform, and a yielding tubular pallet support mounted on the arm.

14. In a molding machine of the character described, the combination with a table having a platform, of molding mechanism associated therewith, means for moving the molded articles over the platform, an outstanding arm projecting from the platform and having a seat in its upper side, a tubular pallet support engaged in the seat, and nipples engaging in the ends of the support to maintain the same in the seat.

15. In a molding machine of the character described, the combination with a platform, of molding mechanism associated therewith, means for moving the molded articles over the platform, a pallet support associated with the platform, and means for alining the upper face of a pallet placed on the support with the upper face of the platform.

16. In a molding machine of the character described, the combination with a platform, of molding mechanism associated therewith, a carriage movable upon the platform for moving the molded articles over said platform, a pallet support associated with the platform, and a device mounted on the carriage and movable over the pallet support for alining the upper face of a pallet placed on the support with the upper face of the platform.

17. In a molding machine of the character described, the combination with a platform, of molding mechanism associated therewith, means for moving the molded articles over the platform, a yielding pallet support associated with the platform, and means for alining the upper face of a pallet placed on the support with the upper face of the platform.

18. In a molding machine of the character described, the combination with a platform, of molding mechanism associated therewith, a carriage movable upon the platform for moving the molded articles over the same, spaced yielding pallet supports projecting from one end of the platform, and spaced devices secured to and projecting from the carriage, said devices being movable over the pallet supports and having their under faces operating on the upper face of the platform, said devices constituting means for alining the upper face of a pallet placed on the supports, with the upper face of the platform.

19. In a molding machine of the character described, the combination with a table having a platform, of a mold that opens through the platform, pressing and expelling means including a plunger operating in the mold, a reciprocatory carriage slidably mounted on the platform, arms projecting from one end of the platform, yielding pallet supports mounted on the arms, and outstanding fingers secured to the carriage and movable beyond the end of the platform having the arms, said fingers engaging a pallet placed on the supports for the purpose of alining the upper face thereof with the upper face of the platform.

20. In a molding machine of the character described, the combination with a table having a mold, of pressing and expelling mechanism operating in the mold, a carriage movably mounted on the table, a feed hopper mounted on the carriage and movable into and out of coöperation with the mold, said hopper having a downwardly tapered upper portion, the top edge being inclined, and a downwardly flared lower end, an agitator rotatably mounted in the downwardly inclined portion of the hopper, and means for moving the carriage and rotating the agitator.

21. In a molding machine, the combination with a mold, of a plunger operating therein, a lever for operating the plunger having a head, toggles for the plunger connected to the head, and a leaf spring connected to the pivot of one of the toggles and bearing against the pivot of another toggle and having a sliding engagement with the head of the lever to hold the latter in an elevated position.

22. In a brick machine, a table top provided with mold cavities, a plunger therein, a laterally movable pressure plate, and pallet guides on said plate.

23. In a brick machine, a table top provided with mold cavities, a plunger therein, a laterally-movable pressure plate, and pallet guides projecting therefrom, the under face of each guide being even with the under face of the pressure plate and its outer end inclined upwardly.

24. In a brick machine, a table top provided with mold cavities, a plunger therein, a laterally-movable pressure plate, and means at the edge of the table for yieldingly supporting the pallet with its upper surface substantially even with the top of the table.

25. In a brick machine, a table top provided with mold cavities, a plunger therein, pallet brackets at the edge of the table top to yieldingly support the pallet, a laterally-movable pressure plate, and laterally-extending pallet guides secured thereto adapted to engage with the pallet and force it down until its upper surface is even with the surface of the table top.

26. In a brick machine, a table provided with mold cavities, a plunger therein, pallet brackets secured at the edge of the table, yielding means in said brackets, whereby the pallet is yieldingly supported, a laterally movable pressure plate, and laterally-extending pallet guides, the under surface of which are even with the bottom of the plate, and the outer end is upwardly inclined.

27. In a brick machine, a table provided with mold cavities, a plunger therein, a laterally movable pressure plate, the ends of which overhang the sides of the table, and gibs therein for holding the bottom of the plate in firm contact with the top of the table.

28. In a brick machine, a flanged table having mold cavities, a plunger therein, a laterally movable pressure plate, the ends of which overhang the sides of the table, and are recessed for engagement with the flanges on the top, gibs adjustably secured between the flanges of the pressure plate of the table for holding the bottom of the plate in firm engagement with the top of the table.

29. In a molding machine of the character described, the combination with a platform, of molding mechanism associated therewith, means for moving the molded articles over the platform, means for yieldingly supporting a pallet at the edge of the platform, and means for alining the upper face of the pallet with the face of the platform over which the molded articles are moved.

30. In a molding machine of the character described, the combination with a platform, of molding mechanism associated therewith, means for moving the molded articles over the platform, means for yieldingly supporting a pallet at the edge of the platform, and spaced fingers or guides that engage over the upper face of the pallet to aline said face with the face of the platform over which the molded articles are moved.

31. In a molding machine of the character described, the combination with a supporting member, of a mold formed therein, a feeding member movable to and from a position over the mold, a rack carried by one member, and a gear journaled on the other member and meshing with the rack to effect the movement of the feeding member toward and from its position over the mold.

In testimony, that I claim the foregoing as my own, I have hereto affixed my signature in the presence of two witnesses.

ERASTUS H. VAN NATTA.

Witnesses:
W. G. DALLAS,
A. W. SEGERHAMMAR.